United States Patent [19]

Tomes

[11] Patent Number: 4,820,531

[45] Date of Patent: Apr. 11, 1989

[54] BACTERIAL TREATMENT TO PRESERVE HAY QUALITY BY ADDITION OF MICROORGANISMS OF THE GENUS BACILLUS

[75] Inventor: Nancy J. Tomes, West Des Moines, Iowa

[73] Assignee: Pioneer Hi-Bred International, Des Moines, Iowa

[21] Appl. No.: 111,300

[22] Filed: Oct. 22, 1987

[51] Int. Cl.$^4$ .............................................. C12K 1/00
[52] U.S. Cl. ...................................... 426/52; 426/53; 426/61; 426/636; 426/807
[58] Field of Search ...................... 426/18, 53, 54, 61, 426/636, 807

[56] References Cited

U.S. PATENT DOCUMENTS 3,899,594  8/1975  Nickerson et al. .................. 426/52
4,035,516  7/1977  Jungvid .................................. 426/2
4,278,690  7/1981  Onodera ................................ 426/18

FOREIGN PATENT DOCUMENTS 2768738  4/1979  U.S.S.R. .

OTHER PUBLICATIONS

Pahlow et al, "Effect and Limitation of Bacterial Silage Inoculants", Wirtschaftseigene Futter, vol. 32 (1986), pp. 20-35.

Primary Examiner—R. B. Penland
Attorney, Agent, or Firm—Zarley, McKee, Thomte, Voorhees & Sease

[57] ABSTRACT

This invention relates to a method of preserving hay comprising treating hay with an effective amount of *Bacillus pumilus* or mutants thereof. The invention also relates to the *Bacillus pumilus* used to preserve hay quality by the above method.

17 Claims, No Drawings

BACTERIAL TREATMENT TO PRESERVE HAY QUALITY BY ADDITION OF MICROORGANISMS OF THE GENUS BACILLUS

About 150 million tons of hay is harvested annually in the United States. The loss in production is probably larger than any other crop. These losses are due to unfavorable alfalfa maturity, rain damage, field harvest loss and storage losses. The losses are typically from 20-40%, but can be as high as 70% if weather conditions are unfavorable. These losses result from the continued respiration of plants, leaf shattering from mechanical damage and leaching due to rain. Baling hay at higher than normal moistures (25-30%) will minimize the risk of rain damage and mechanical leaf losses. However, baling at moistures greater than 20% greatly increases the risk of storage losses due to oxidation and molding.

Storage losses are a major, but controllable source of nutrient loss. Hay stored inside a building at moisture contents below 20% will have a normal dry matter loss of between 5-10%. Higher moistures enhance the activity of aerobic oxidative microorganisms resulting in heat production. Excessive heat results in dry matter losses due to respiration which produces $CO_2$ and water. The heat also causes nutrient losses through nonenzymatic browning reactions. The amount of heat that is generated will depend on the moisture concentration of the hay, the ambient temperature, the existing microbial populations and the size and density of the bales.

Excessive heat damage reduces the protein digestibility and available energy. Heat damaged protein is measured by determining the nitrogen content of the fiber as acid detergent fiber nitrogen (ADIN or ADF-N). Under normal conditions, less than 7% of the total nitrogen should be present in the fiber. Excessive heat damage has occurred when this value reaches 15%.

Mold damage during storage can also cause significant losses. Only about 5% of molds produce mycotoxins, however, they can adversely effect palatability and feed intake. Feeding moldy hay to animals will result in significantly lower dry matter intake, reduced weight gains and poorer feed conversions. These losses can be as large as 25% over nonmoldy controls.

Stored hay contains naturally-occurring opportunistic epiphytes. These epiphytes may be beneficial or detrimental to the hay quality and compete among themselves for ecological dominance in the stored hay. These epiphytes may be either bacteria or fungi. Common bacterial spoilage organisms are those which are members of the genera Sporosarcina and Bacillus. Fungal spoilage is often caused by members of the genera Aspergillus, Penicillium and Mucor.

Various approaches have been made to limit the proliferation of those epiphytes responsible for spoilage of agricultural products. One simple approach has been to spray the agricultural material at the time of storage with a mold inhibitor as, for example, propionic acid. A major disadvantage of this approach is its cost since large quantities of acid must be used to adequately treat the agricultural material. In addition, the inherently toxic and corrosive nature of acids such as propionic acid requires that special handling techniques be used by the farmer to protect personnel handling the acid. Further, all equipment coming in contact with the acid must be thoroughly cleaned to avoid corrosive damage. For further details with regard to one other approach, see my copending and commonly assigned application entitled HAY PRESERVATIVE, U.S. Pat. No. 4,743,454, filed July 28, 1986, which relates to use of an inorganic salt mixture of zinc oxide, magnesium oxide and a water soluble copper ion source in combination with an organic acid such as acidic acid, propionic acid or sorbic acid.

However, in spite of extensive research into the development of various products for use as agricultural product inoculants, spoilage of hay has remained an on-going problem.

Accordingly, it is a primary objective of the present invention to provide a hay preservative composition which adds to the hay only naturally occurring organisms at levels which hinder growth of spoilage organisms, while reducing heat in high moisture hay.

Another objective of the present invention is to provide an improved hay preservative which surprising acts to effectively reduce heat in high moisture hay without the necessity for adding unnatural hay additives.

A further objective of the present invention is to provide a hay preservative composition which has no environmental polluting risks.

A yet further objective of the present invention is to provide a hay preservative which will provide a quality hay product as measured by temperature, dry matter recovery, nitrogen profile, color, and microorganism counts including yeasts and molds.

An even further objective of the present invention is to provide a hay preservative, as well as a method for preserving hay which adds to the hay, at hay preserving levels, *Bacillus pumilus* microorganisms.

A still further objective of the present invention is to provide hay preservative compositions which when applied to hay will reduce heat degradation risk, while simultaneously hindering growth of spoilage organisms such as *Aspergillus flavus*.

The method and means of accomplishing each of these objectives as well as others will be apparent from the detailed description of the invention which will follow hereinafter.

SUMMARY OF THE INVENTION

In the present invention, hay is treated with *Bacillus pumilus* to preserve hay quality. *Bacillus pumilus* is capable of inhibiting spoilage organisms responsible for the deterioration of hay stored for long periods of time.

Thus, the present invention provides a method of treating hay to enhance its preservation which comprises administering to the hay an effective amount of *Bacillus pumilus* or mutants or equivalents thereof.

The invention also provides for a hay treating composition containing *Bacillus pumilus*. The compositions may be solid or liquid.

DETAILED DESCRIPTION OF THE INVENTION

Spoilage of hay due to deterioration caused by the growth of spoilage organisms is a major problem in the agricultural community. Typical spoilage organisms include the genus Aspergillus and the species *Aspergillus flavus*, as well as the genus Penicillium and Mucor.

Hay that is baled at greater than about 25% moisture will heat and mold about 97% of the time, as indicated by field surveys. These heated bales are remarkably poorer in color, nutritional value and have higher visible mold.

It has been discovered that strains of *Bacillus pumilus* will preserve hay quality. While not wishing to be bound by any theory of operability, it is believed that the *Bacillus pumilus* may produce inhibitory compound(s) that inhibit the growth of fungi and also bacteria such as the bacterial isolate Sporosarcina. Sporosarcina are responsible for the undesirable white bloom observed on the stems of hay after only a few days of storage. These organisms are typically observed in very hot bales. They also appear to act to encourage the growth of fungi either concurrent to their growth or at a later stage.

Understanding microbial interactions is an essential element of the use of this strain in improving the quality of stored hay. Initially when hay is baled a large bloom of one class of microorganisms occurs (the Gram negative group). This is observed in the first 1–3 days. Thereafter this is replaced by a second group (the Gram positive group). *Bacillus pumilus* belong to this group, the Gram positive group. If the selected *Bacillus pumilus* are present in high numbers, as hereinafter defined, at this stage the hay will not heat or mold. Later, other groups of microflora become dominant as the populations of *Bacillus pumilus* subside. At the end of the storage period when the hay is fed, the Bacillus will be a part of the microflora. Again, while applicant does not wish to be bound by any theory, it is possible the Bacillus may effect the quality of the hay simply by competition for nutrients with the other organisms present.

In the method according to the invention, hay is treated with a hay preserving effective amount of *Bacillus pumilus*, or mutants or equivalents thereof, to enhance preservation and to maintain the quality of the hay, and as well to diminish the proliferation of spoilage organisms.

The method of the invention is especially useful in that the organism of the invention is non-pathogenic and occurs naturally in hay at low levels and therefore will not cause disease in an animal consuming the preserved agricultural product. Unlike many types of preservation which utilize the application of expensive often hazardous chemicals, the method of the invention relies instead upon the enhancement of colonization by desirable naturally occurring organisms through improving their ability to compete with naturally-occurring spoilage organisms, such as *Aspergillus flavus*. Controlling these harmful organisms is a major consideration, since many of the organisms associated with spoilage of preserved agicultural products are fungi which are known to produce potent mycotoxins. These mycotoxins are known to cause illness and even death in animals consuming feed contaminated with these fungi.

There are certain preferred strains of *Bacillus pumilus* which have been isolated and found most preferable in the composition of this invention. Those strains are available upon request by the assignee and are identified as Strain Nos. 288, 289, 290, 296, 299, 302, 305 and 307. The strains have been deposited with the American Type Culture Collection at Rockville, Md., and are further identified as ATCC accession numbers 53682, 53683, 53684, 53685, 53686, 53687, 53688, and 56689, respectively. One may use a mixture of these preferred strains which is satisfactory, or any lesser combination of them, or simply a single strain.

*Bacillus pumilus* was isolated from stored hay using techniques well known in the art and described generally above. Other *Bacillus pumilus* may be isolated and tested according to routine experimentation to assess the efficacy of the *Bacillus pumilus* in the preservation of hay quality.

By the term "effective mutants thereof" is intended any and all mutants of *Bacillus pumilus* which demonstrate the desired fungal inhibiting properties of the present strain or substantial equivalents thereof. Such mutants are considered to be functionally equivalent to the parental strain. It is well known to those of ordinary skill in the art that spontaneous mutation is a common occurrence in microorganisms and that mutations can also be intentionally produced by a variety of known techniques. For example, mutants can be induced using chemical, radioactive, and recombinant techniques.

Regardless of the manner in which the mutations are induced, the critical issue is that the mutants function to preserve the agricultural product as described for the parent strain. In other words, the present invention includes mutations resulting in such minor changes as, for example, minor taxonomic alterations such as the fermentation of certain sugars.

While the invention is being described with particularity with regard to the preferred species *Bacillus pumilus*, and certain specific strains thereof, it should be understood that the invention contemplates that one may use other genetically closely related organisms of the genus Bacillus. It may therefore be possible to accomplish most if not all of the objectives of this invention with other species members of the genus Bacillus, such as *Bacillus subtilus* and *Bacillus cereus*. *Bacillus pumilum* is strongly preferred because it is normal flora of hay.

By the term "hay" is intended all forms of hay as the term is commonly used in agriculture. Hay is most commonly composed of alfalfa, grass, or mixtures of alfalfa and grass. It is possible that the hay preservative composition of this invention may also be used as an effective silage inoculant to reduce spoilage of silage. Another distinct possibility is that the composition may effectively function to preserve grains such as corn, wheat, rice and soybeans.

In the present invention, the inhibition of organisms responsible for hay spoilage is accomplished by treating the hay with organisms of the genus Bacillus, especially *Bacillus pumilus* or with compositions containing *Bacillus pumilus* or closely related organisms, and as well by treatment with effective mutants or equivalents of *Bacillus pumilus* and compositions containing same.

The compositions which are used in the method of the invention may be in either liquid or dry form and ay contain additional bacterial strains. In solid treatment forms, the composition may comprise the *Bacillus pumilus* together with a carrier. The carrier may be in the nature of an aqueous or nonaqueous liquid or a solid. In solid forms, the composition may contain solid carriers or physical extenders. Examples of such solid carriers, solid diluents or physical extenders include malto-dextrin, starches, calcium carbonate, cellulose, whey, ground corn cobs, and silicone dioxide. In short, the carrier may be organic or an inorganic physical extender. The solid composition can be applied directly to the hay in the form of a light powder dusting, or if it is disbursed in a liquid carrier it can successfully be sprayed on the hay.

Typical compositions useful for treating hay according to this invention contain $10^2$–$10^{12}$ viable organisms/gm, preferably $10^4$–$10^{10}$ viable organisms/gm, and more preferably $10^5$–$10^7$ viable organisms/gm.

The treatment range for hay is typically $10^5$–$10^{15}$ viable organisms/ton, preferably $10^7$–$10^{13}$ viable organisms/ton, and more preferably $10^8$–$10^{10}$ viable organisms/ton.

The composition of the present ivention can include, in addition to *Bacillus pumilus* or mutants or equivalents of this organism, other common farm product preservation organisms as, for example, Lactobacillus, Streptococcus, and Pediococcus, and certain enzymes from fungi or bacteria.

Those of ordinary skill in the art will know of other suitable carriers and dosage forms, or will be able to ascertain such, using routine experimentation. Further, the administration of the various compositions can be carried out using standard techniques common to those of ordinary skill in the art.

The above disclosure generally describes the present invention. A more complete understanding can be obtained by reference to the following specific examples which are provided herein for purposes of illustration only and are not intended to be limiting unless otherwise specified.

EXAMPLES

Hay was treated with inocula prepared with *Bacillus pumilus* strain Nos. 288, 289, 290, 296, 299, 302, 305 and 307, in mixture.

Quality of hay was determined by examining the temperature, microflora and nutritional analysis. Visual scores were determined for all treatments including color, white scale and mold spores.

Alfalfa was cut with a mower-conditioner and allowed to dry in the field under normal field conditions. The mowed hay was placed in windrows and raked only once prior to baling. Drying rate, maturity and weather data were recorded. Hay was baled at 22 to 34 percent moisture across all trials, but within a given trial hay moisture varied only 2 to 5 percent between treatments and control bales.

For small square bales experiments, the following protocol was followed. Hay was treated with water soluble treatments of the hay preservative using a sprayer. For the longer field experiment, the treatment was applied to 15–20 100-pound bales. Control uninoculated bales were prepared as well. A total of 15–20 bales was prepared for the control. Hay was transported from the field, stacked and stored on wooden pallets on a cement floor in an enclosed shed. Temperature probes were placed in the center of each stack and temperature recorded hourly.

A smaller model system was also developed to simulate larger bale studies. One-pound of hay was packed into a styrofoam shipping container (2-inch wall thickness) with approximate dimensions of 6"×10"×6". The hay was compressed by placing a brick on top of the hay after a thermister had been placed into the center of the hay mass. The styrofoam lid was placed loosely on the top and the entire container placed in a 37° C. incubator to initiate heating. Treatments were applied to the hay by spraying with a glass TLC sprayer.

Sampling of bales was performed by removing six core samples/sampling time with a Penn State Forage Sampler. Within each stack two lower, two middle and two top bales were sampled to minimize variability within stacks. Sample cores were placed in whirl pak sterile bags, pooled within each treatment and stored on ice for transport to the laboratory. Sampling of model bale styrofoam containers was performed by removing one sample from the center of each container. Sampling times were approximately 0, 2, 7, 14, 21, 30 and 60 days.

The microorganism counts of the *Bacillus pumilus* as applied to the hay samples by spraying provided an organism count of $10^6$/gm of hay. This corresponds to an organism count of $10^9$/ton of hay. The organisms were a mixture on equal parts basis of strain numbers 288, 289, 290, 296, 299, 302, 305 and 307 of *Bacillus pumilus*. The *Bacillus pumilus* treatments were prepared by growing the eight strains individually in tryptic soy broth for 24 hours at 37° C. Cells were removed by centrifugation at 4° C. and the cell pellet re-suspended in 0.04 M phosphate buffer. Cells were transported to the field on ice for immediate application or frozen at −70° C. for future use. Prior to application to the hay, cells were dispensed in five gallons water and applied (at five gallons per ton) with a sprayer attached to the baler. The colony forming units/treatment was determined at the time of application.

The samples were analyzed for dry matter, ADF, ADF-N, NDF, and N content. The temperature was monitored on an hourly basis by use of temperature thermisters accurate to ±0.2° C. The data was analyzed using the covarients dry matter (DM) and day 0 temperature.

The hay was observed visually throughout the trial and at the end of the storage period for evidence of mold and white spoilage microflora. The hay was evaluated for moldiness and white spoilage on a scale of one to 10 with 10 being poorest quality. Color differences were determined at the end of the storage period using paint strips for comparisons. Colors ranged from 1 green to 23 brown.

In the smaller model system, the temperature differences between experiments represent the most informative results because thermisters are accurate to ±0.2° C. and hourly readings were taken. This resulted in about 500 data points/treatment/experiment. The significantly coolest treatment overall in the experimental models was the Bacillus (Tables 1 & 2). This treatment tended to have lower yeast and molds populations. The Bacillus treatment also had significantly higher nutritional values (lower ADF). NDF, ADF-N, WSC, N and available protein determinations also tended to show higher nutritional values, although these differences were not significant. The Bacillus treatments also had significantly better visual scores indicating less visual molding. Color scores were less consistent with no difference between the treatments in these small model bales.

TABLE 1

EFFECT OF SELECTED TREATMENT ON MEAN TEMPERATURE LOGIO MICROBIAL COUNT AND VISUAL QUALITY OF HAY IN EXPERIMENTAL MODEL BALES

| Treatment | Reps | Temp | Aerobes | YM[1] | Color | Mold[2] |
|---|---|---|---|---|---|---|
| Bacillus | 3 | 36.57* | 8.10 | 2.72 | 10.5 | 4.5* |
| Control | 5 | 37.28 | 8.36 | 3.30 | 9.25 | 7.5 |

[1]YM values are for the end of the trial
[2]Moldiness; the amount of mold observed visually in bales on a scale of 1 (not moldy) to 10 (very moldy)
*Treatment means followed by an asterisk are significantly different from the control $P < .1$

TABLE 2

EFFECT OF SELECTED TREATMENTS ON FINAL CHEMICAL COMPOSITION OF HAY IN EXPERIMENTAL MODEL BALES

| Treat-ment | Reps | N | NDF | ADF | ADF-N | Hemi-Cellu-lose | AP[1] |
|---|---|---|---|---|---|---|---|
| Bacillus | 3 | 3.01 | 55.11 | 39.60* | .25 | 15.51* | 17.25 |
| Control | 5 | 2.80 | 57.30 | 43.58 | .32 | 13.72 | 15.50 |

[1]Available protein (N %)(% ADF-N)(6.25) = AP
*Treatments followed by an asterisk are significantly different (P < .1) from the control The same trends shown in the model system of Tables 1 and 2 were observed in the larger scale hay bales as evidenced by Tables 3, 4 and 5 below. That is, the Bacillus treated hay was cooler than the control treatment. The yeast and mold counts were similar in all bales but visual molding was reduced in the *Bacillus pumilus* treatments and the color was greener. Nutritional analysis also indicated similar trends to those observed in the model system shown in Tables 1 and 2. Available protein (AP) was higher in the Bacillus treated bales and the ADF and the NDF values indicated highest nutritional quality in these treated bales.

Treatment of hay with *Bacillus pumilus* strains resulted in cooler, less moldy greener bales than unioculated control bales. Treatment with *Bacillus pumilus* also gave bales that had higher available protein intake, total digestible nutrient intake and daily energy intake.

TABLE 3

THE EFFECT OF TREATMENTS ON THE MEAN TEMPERATURE, MICROBIOLOGICAL (LOGIO) AND VISUAL QUALITY OF HAY IN SMALL SQUARE BALE STACKS EXPERIMENT #590 BALES (2ND CUTTING)

| Treatment | Temp °C. | Total Aerobes | YM[1] | Color | W | Mold |
|---|---|---|---|---|---|---|
| Bacillus | 19.92* | 8.82 | 3.33 | 6.5 | 0.0 | 0.0* |
| Control | 24.92 | 9.00 | 3.00 | 10.5 | 3.5 | 2.5 |

[1]YM values are for the end of trial.
*Treatment means followed by an asterisk are significantly different (P < .1) from the control.

TABLE 4

THE EFFECT OF TREATMENTS ON THE FINAL CHEMICAL COMPOSITION OF HAY IN SMALL SQUARE BALE STACKS EXPERIMENT #590 BALES

| Treatment | N | NDF | ADF | ADF-N | Hemi-cellulose | AP |
|---|---|---|---|---|---|---|
| Bacillus | 3.42* | 52.70 | 38.32 | .221 | 14.38 | 19.99* |
| Control | 3.23 | 56.30 | 40.49 | .246 | 15.81 | 18.65 |

N initial = 3.61
NDF initial = 51.42
ADF initial = 38.66
Hemicellulose = 12.76
ADF-N = .276
AP = available protein = 20.83
DM = 70.15
*Treatment followed by an asterisk are significantly different (P < .1) from the control When the spray application of the examples shown is replaced with a powder dust application to achieve organism levels within the ranges specified in the specific examples shown, similar results are obtained in that the bales are cooler, that is there is a reduction in heat, there is a hinderance of growth of spoilage organisms in the microflora and there is evidence of increased nutritional value of the hay. It therefore can be seen that the invention accomplishes at least all of the stated objectives.

What is claimed is:

1. A method of preserving hay quality in stored high moisture hay, which consists essentially of:
treating fresh hay under aerobic condition with a small but hay quality preserving and heat reducing effective amount of the microorganism *Bacillus pumilus* or mutants thereof.

2. The method of claim 1 wherein said treating is by spraying.

3. The method of claim 2 wherein the amount of viable organisms per ton of hay treated is within the range of from about $10^5$ to about $10^{15}$ organisms per ton of hay.

4. The method of claim 3 wherein the amount of organisms is from $10^7$ to $10^{13}$ per ton of hay.

5. The method of claim 4 wherein the amount of organisms is from about $10^8$ to about $10^{10}$ per ton of hay.

6. The method of claim 1 wherein the *Bacillus pumilus* is selected from the group consisting of *Bacillus pumilus*, strain Nos. 288, 289, 290, 296, 299, 302, 305 and 307.

7. The method of claim 1 further comprising adding of additional hay preservations.

8. The method of claim 7 wherein said other organisms are selected from the group of Lactobacillus, Streptococcus, Pediococcus and enzymes derived from fungi or bacteria.

9. A method of preserving hay quality in stored high moisture hay, consisting essentially of:
adding to fresh hay under aerobic conditions which enhance organism colonization, *Bacillus pumilus,* or mutants thereof; in a hay preserving effective amount; and
allowing said organisms to significantly colonize and thus forestall colony growth of naturally occurring spoilage organisms whose colonization is therefore hindered and to reduce heating in said hay.

10. The method of claim 9 wherein said organisms are added by spraying a liquid containing them on said hay.

11. The method of claim 10 wherein said organisms are added to provide a viable organism count of from about $10^5$ to about $10^{15}$ viable organisms per ton of hay.

12. The method of claim 11 wherein the amount of organisms is from $10^7$ to $10^{13}$ per ton of hay.

13. The method of claim 12 wherein the amount of organisms is from about $10^8$ to $10^{10}$ about per ton of hay.

14. The method of claim 9 wherein the *Bacillus pumilus* is selected from the group consisting of *Bacillus pumilus*, strain Nos. 288, 289, 290, 296, 299, 302, 305 and 307.

15. The method of claim 9 further comprising adding of hay preservation organisms to said fresh hay.

16. The method of claim 15 wherein said other organisms are selected from the group of Lactobacillus, Streptococcus, Pedicoccus and enzymes from fungi or bacteria.

17. A method of inhibiting organisms responsible for hay spoilage in stored high moisture hay, consisting essentially of:
treating fresh hay with a hay preserving effective amount of *Bacillus pumilus* or other genetically closely related organisms;
said treating occurring under aerobic conditions which enhance organism growth of said *Bacillus pumilus* or other closely related organisms and thus inhibit growth of naturally occurring spoilage organisms and reduce heating in said hay.

* * * * *